United States Patent [19]
Gasbarro

[11] Patent Number: 5,766,064
[45] Date of Patent: Jun. 16, 1998

[54] METHOD AND APPARATUS FOR SCORING POULTRY HOCKS

[76] Inventor: Geno N. Gasbarro, 1401 Lakeshore Dr., Apt. B. Columbus, Ohio 43219

[21] Appl. No.: 810,704

[22] Filed: Mar. 3, 1997

[51] Int. Cl.[6] .......................... A22C 17/10; A22C 21/00
[52] U.S. Cl. ..................... 452/148; 452/149; 452/166; 452/167
[58] Field of Search ..................... 452/148, 149, 452/154, 166, 167, 169

[56] References Cited

U.S. PATENT DOCUMENTS

| | | |
|---|---|---|
| 3,942,222 | 3/1976 | Strandine et al. .................. 452/148 |
| 5,071,388 | 12/1991 | Lindert ............................... 452/166 |
| 5,154,665 | 10/1992 | Hazenbroek ....................... 452/167 |
| 5,176,563 | 1/1993 | van den Nieuwelaar et al. ..... 452/167 |
| 5,248,277 | 9/1993 | Bos et al. ........................... 452/166 |
| 5,314,375 | 5/1994 | O'Brien ............................. 452/149 |
| 5,551,910 | 9/1996 | Nielsen et al. ..................... 452/149 |

*Primary Examiner*—Willis Little
*Attorney, Agent, or Firm*—Francis T. Kremblas, Jr.

[57] ABSTRACT

An apparatus and method for automatically scoring the hock portion of a poultry leg to sever the surrounding skin and soft connective tissues from the underlying bone which is characterized by employing oppositely directed water knives aligned at a right angle to the linear path of travel of a vertically disposed poultry leg to effect a complete circumferential cut about the periphery of the hock area in a single pass through the water knives. The water knives are formed by a plurality of water jets or streams emitted from a horizontally disposed manifold mounted within a protective housing to contain the spray of water created and direct the waste water to a collection area.

5 Claims, 8 Drawing Sheets

METHOD AND APPARATUS FOR SCORING POULTRY HOCKS

TECHNICAL FIELD

The present invention relates generally to food processing and particularly to a process and apparatus for preparing a poultry leg for a subsequent step in a commercial deboning process by scoring the hock portion of the leg.

BACKGROUND ART

In commercial operations for deboning poultry legs to remove the meat from the leg bone, the hock portion of the leg is scored or cut about its whole circumference to better enable the meat to be removed from the leg bone. The required cut must completely sever the outer skin and the underlying soft tissue which consists of primarily relatively strong tendons and ligaments. After such scoring, the meat portion is more readily and effectively removed from the bone manually, or preferably, by automated deboning apparatus in a manner well-known in the art.

Currently, the circumferential score or cut is done manually which is costly from a labor standpoint and lacks the consistency in the desired quality of the score cut. If the score cut is not complete, meat is not efficiently removed from the bone in the subsequent deboning step which constitutes a loss of viable product. In view of the relatively difficult circumferential cut required and the nature of the relatively tough tendon and ligament tissue to be severed, a relatively simple and efficient automated hock scoring device has eluded those of ordinary skill in the art. Manual scoring, therefore, has remained the primary means for accomplishing this task despite its relative high cost and lack of consistently high quality in the nature of the score cut made.

BRIEF DISCLOSURE OF INVENTION

The present invention relates to a novel, automated poultry hock scoring apparatus which utilizes a unique arrangement including opposingly directed water knives for cutting around the whole periphery of the hock portion of a poultry leg while the leg is moved linearly past a cutting station.

As one aspect of the present invention, a housing is provided which shields the surrounding environment from any undesirable spray created by the water knives and includes a configuration readily adaptable for use in a conventional conveyor line used to transport the poultry legs from one processing step to another.

Another aspect of the present invention includes a novel arrangement of opposed water knives wherein each one comprises a linear array of closely spaced nozzles. The nozzles are disposed in a tubular member functioning as a manifold which is connected to a source of pressurized water to deliver a plurality of water streams or jets capable of severing the skin and underlying soft tissue of the poultry leg as it passes between opposing nozzles. The nozzles in the tubular member are accurately located relative to one another to deliver parallel water streams or jets to assure a complete and consistent cut is made as the leg portion is conveyed passed the water knives.

As another aspect of the present invention, the housing includes a lower chamber or compartment which is disposed to primarily collect the waste water from the water knives as well as provide a grate for catching any leg product which might become dislodged from the conveying line.

In summary, an automated poultry hock scoring apparatus is provided which utilizes a pair of opposing water knives to completely sever the skin and underlying soft tissue about the total circumference of the hock as it is conveyed in a linear path past the water knives in a relatively simple, efficient and consistently high quality manner.

DETAILED DESCRIPTION

Figure 1:
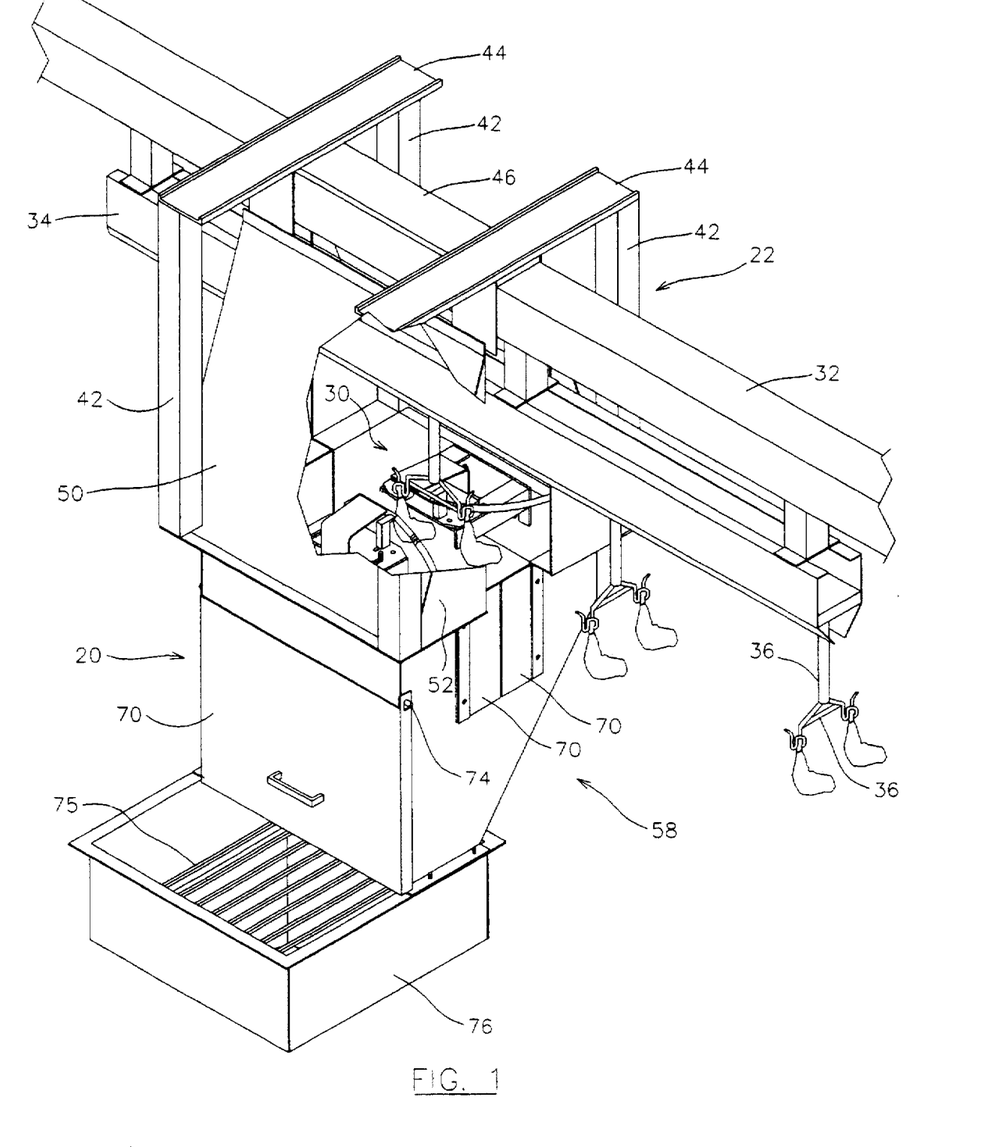
FIG. 1 is a perspective view of an automated poultry hock scoring apparatus constructed in accordance with the present invention, a portion of the housing is shown broken away to better view the interior components.
Figure 2:
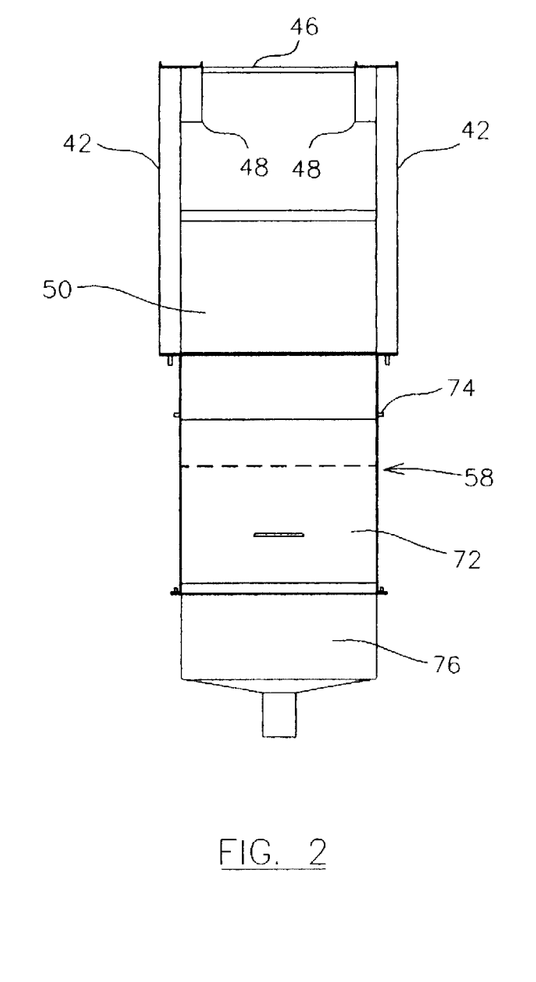
FIG. 2 is a front elevational view of the apparatus shown in FIG. 1 shown removed from the conveyor apparatus used to deliver product through the hock scorer apparatus.
Figure 3:
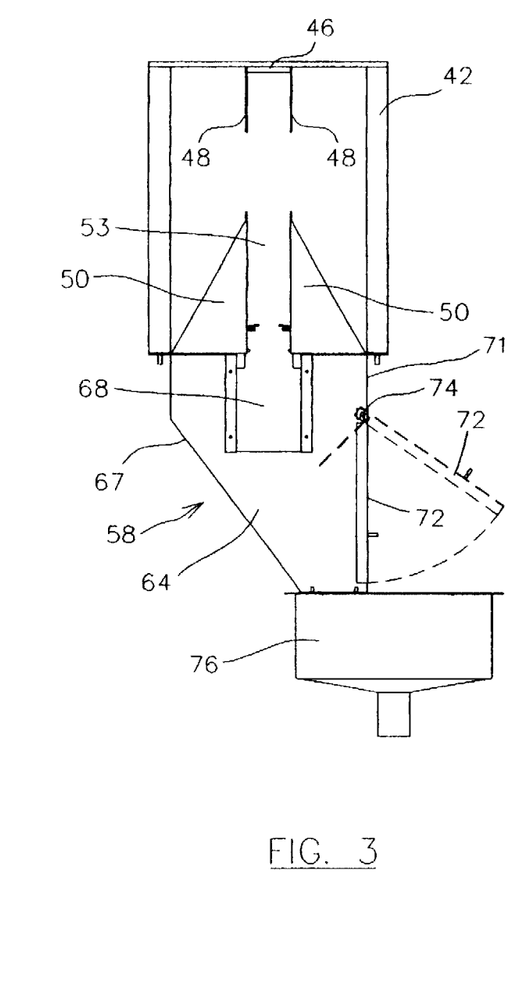
FIG. 3 is a side elevational view of the apparatus as shown in FIG. 2.
Figure 4:
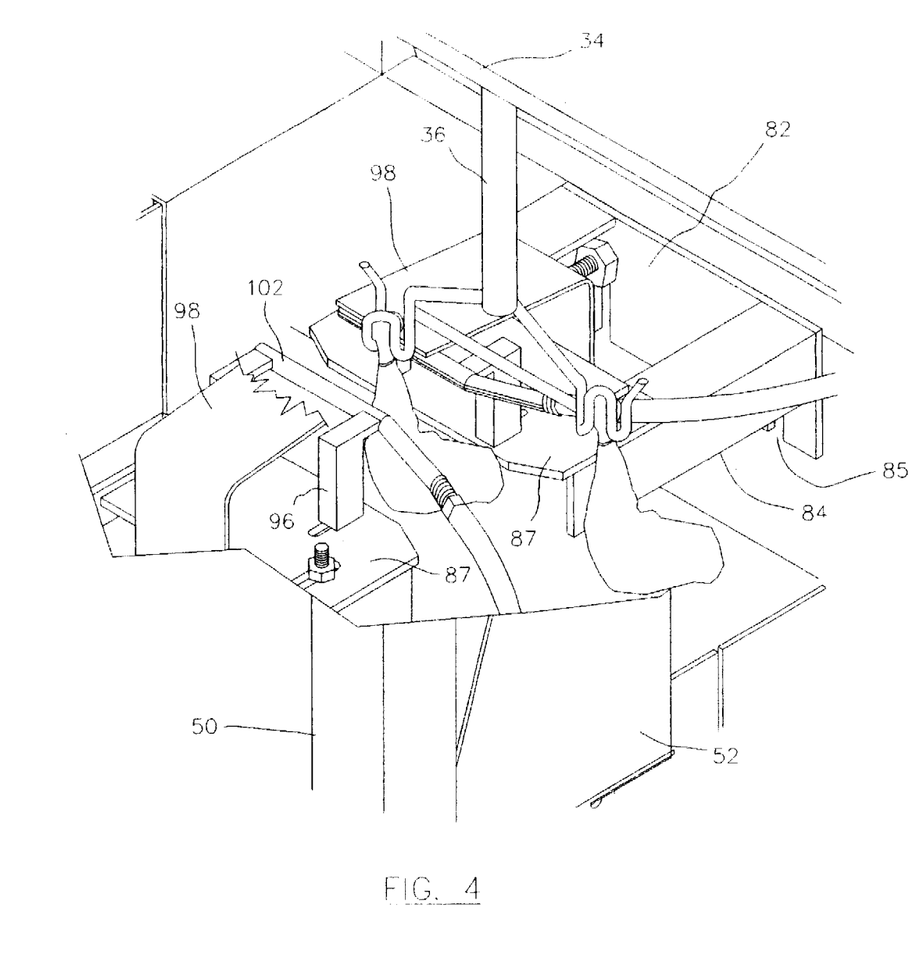
FIG. 4 is a partial perspective view of a portion of the interior of the housing shown in FIG. 1 illustrating the water knife cutting means mounted within the housing.
Figure 5:
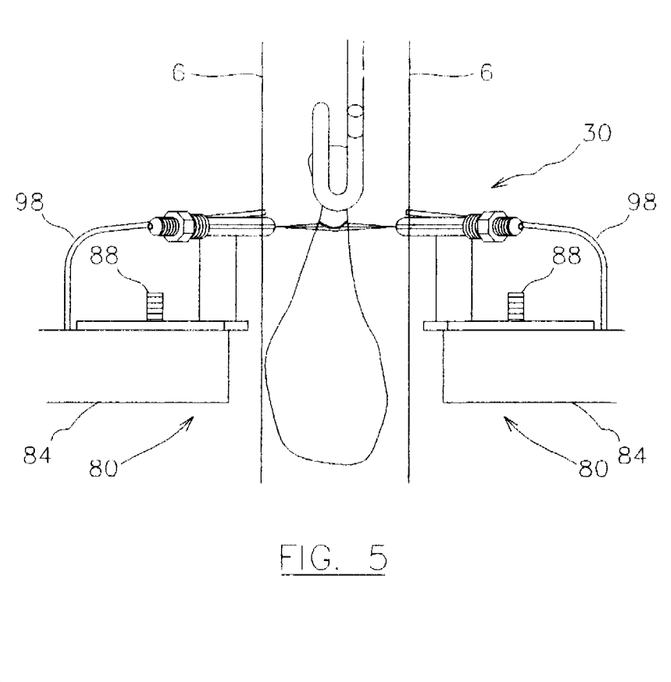
FIG. 5 is a partial front view of the apparatus of FIG. 1 showing the water knife cutting means and the adjustable mounting bracket supporting the water knives in relationship to a poultry leg presented thereto.
Figure 6:
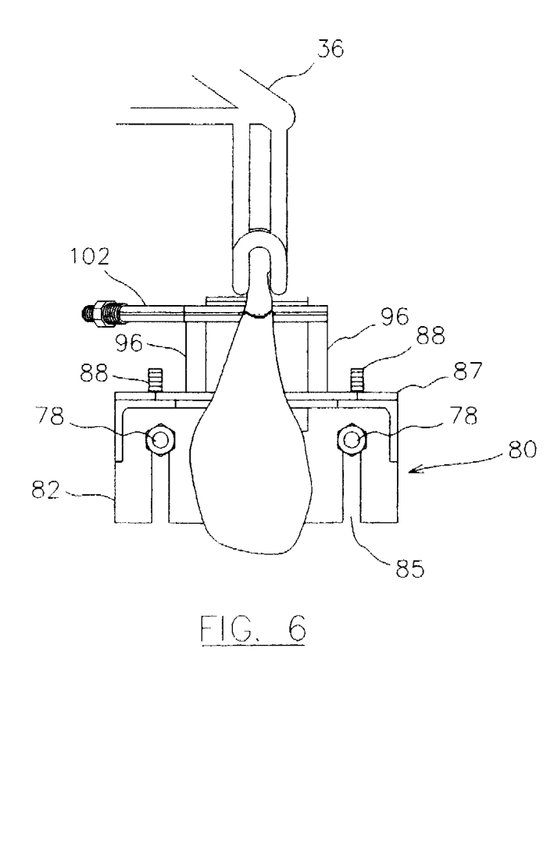
FIG. 6 is a cross-sectional side view of that portion of the apparatus shown in FIG. 5, the section being taken along line 6—6 in FIG. 5.
Figure 7:
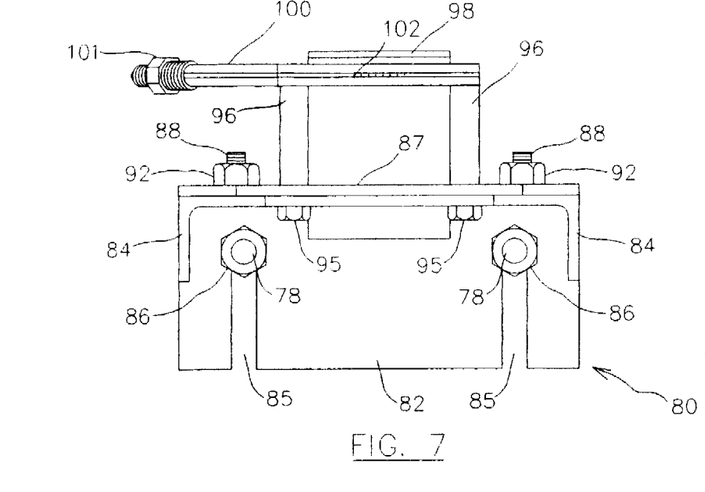
FIG. 7 is a partial side elevational view showing a portion of the apparatus shown in FIG. 1 illustrating one of the water knife cutting means and its mounting bracket isolated from the remaining parts of the apparatus.
Figure 8:
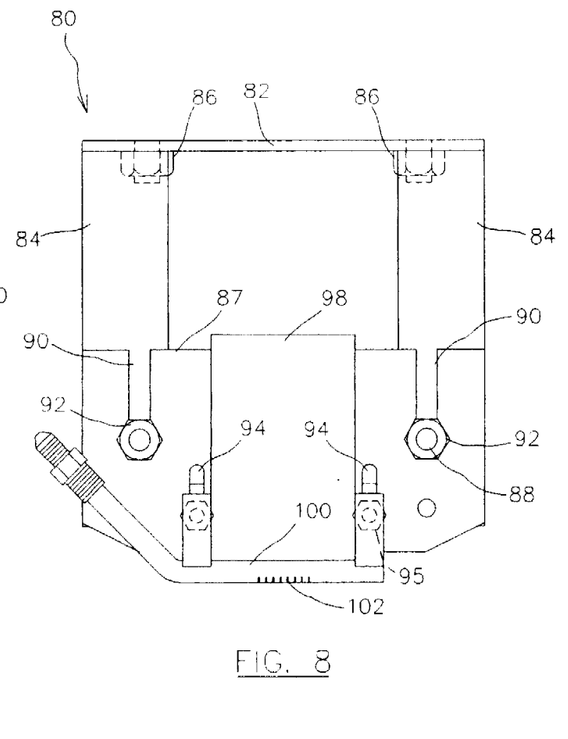
FIG. 8 is a top plan view of the portion of the apparatus shown in FIG. 7 illustrating the mounting bracket for the water knife assembly.
Figure 9:
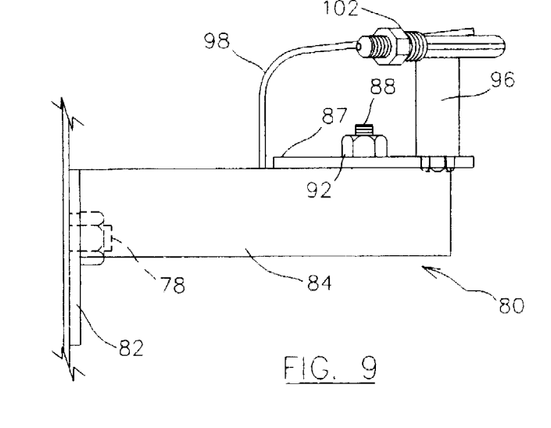
FIG. 9 is a front view of the portion of the apparatus shown in FIG. 7.
Figure 10:
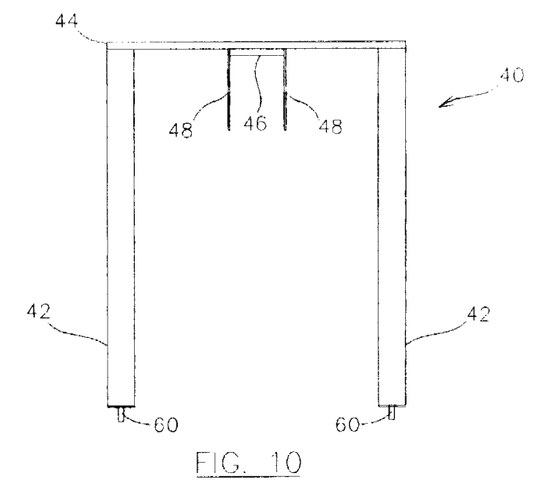
FIG. 10 is a front elevational view of the support frame relative to the direction of the travel of product which forms a part of the apparatus shown in FIG. 1 and is shown in isolation from the remaining structure.
Figure 11:
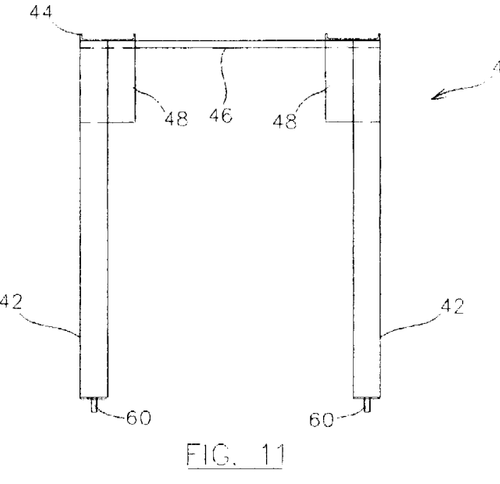
FIG. 11 is a side elevational view of the support frame shown in FIG. 10.
Figure 12:
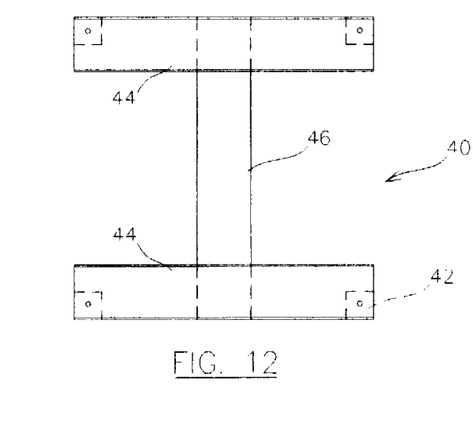
FIG. 12 is a top plane view of the support frame shown in FIG. 10.
Figure 13:
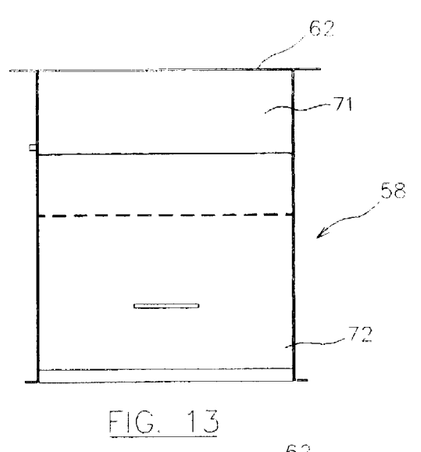
FIG. 13 is a side elevational view of a portion of the apparatus shown in FIG. 1, illustrating the lower chamber of the housing separated from the remaining structure.
Figure 14:
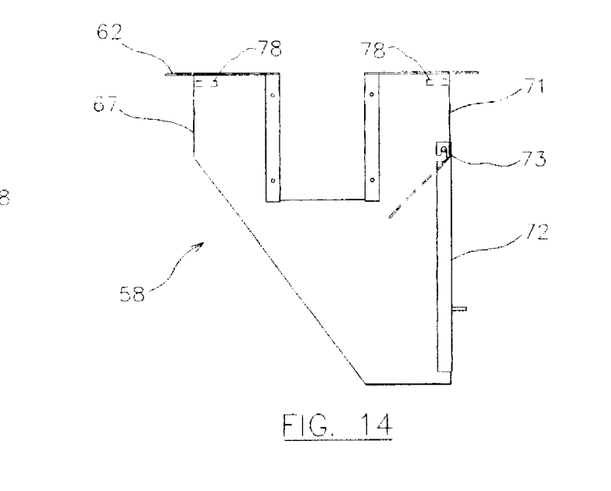
FIG. 14 is a front view of the lower chamber portion shown in FIG. 13.

An automated poultry hock scoring apparatus constructed in accordance with the present invention is shown in FIGS. 1–3 and includes a housing, indicated generally at 20 which is adapted to be mounted in an operative position in connection with a conventionally constructed conveyor, indicated generally at 22.

Housing 20 includes front, rear and side walls, 24, 26 and 28 respectively, forming an upper chamber which generally encloses a cutting or scoring station. The cutting station, indicated generally at 30, includes opposing water knives which are formed by a pair of tubular members provided with a plurality of nozzles as will be described in detail later herein.

Conveyor 22 conventionally includes an upper support member 32 which typically extends the length of the production line wherein the poultry legs are carried past the particular processing locations from loading to deboning and collecting the meat removed from the bone. A conveyor mechanism 34 of conventional construction is mounted to member 32 and carries a plurality of spaced shackles 36 which are driven along the conveyor past the various processing steps from initial loading of the legs to the final deboning station, not shown. Each shackle 36 preferably carries two poultry legs and mechanism 34 includes means to optionally pivot the shackle at least 90 degrees to present the legs in two different orientations such as seen in FIG. 1. Since the conveyor used is conventional and well-known to one of ordinary skill and alone forms no part of the present invention, further details of its specific construction are not deemed necessary to enable one skilled in the art to understand the present invention.

Referring to FIGS. 1–3 and 10–16, housing 20 is mounted in an aligned position on conveyor 22 by means of a support or mounting Frame, indicated generally at 40, which includes four vertical legs 42 fixed to two horizontal support beams 44. Another support beam 46 is fixed to beams 44 and includes two pairs of oppositely depending plates 48 which are adapted to fit over upper support 32 of conveyor 22 to position frame 40 as best seen in FIG. 1.

Figure 16:
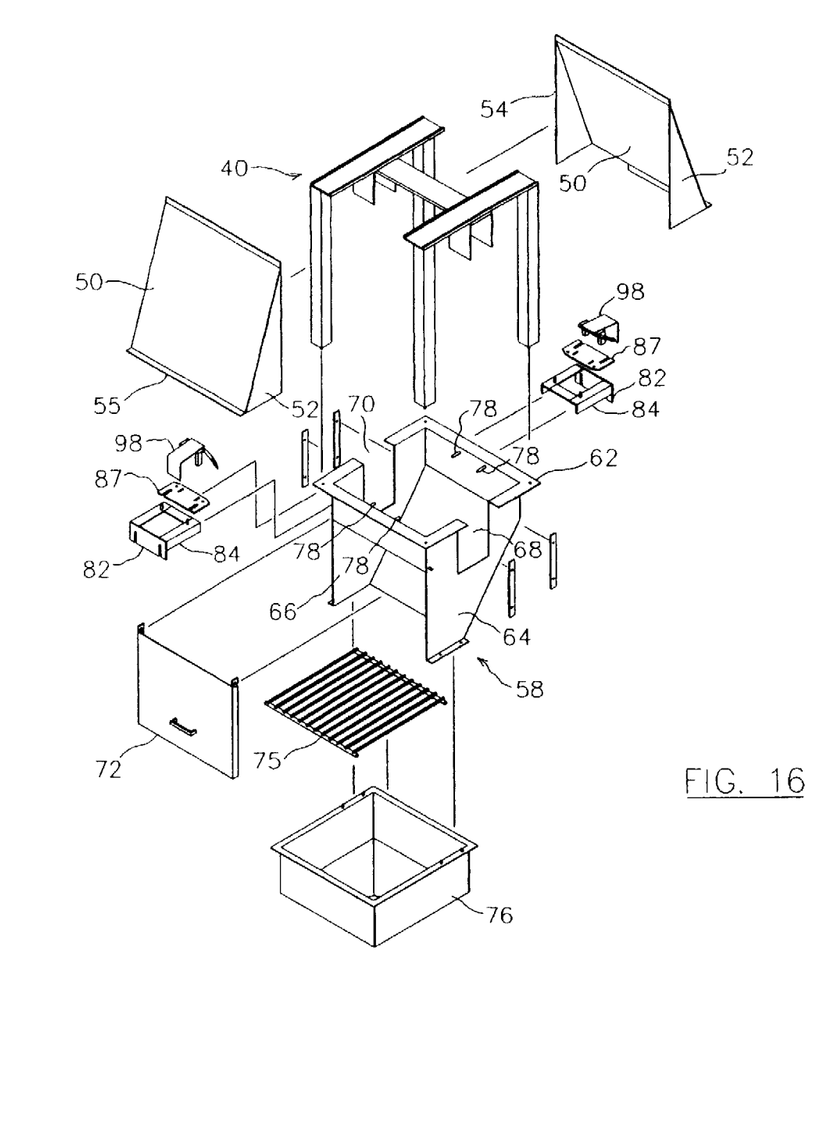
FIG. 16 is an exploded view of the apparatus shown in FIG. 1.

Prior to mounting frame 40 on conveyor 22, a preformed sheet metal siding may be attached to the inner portions of each pair of vertical legs 41 via welding or other conventional means to form side walls 50 and front and rear walls 52 and 54 as best seen in the exploded view shown in FIG. 16. Front and rear walls 52 and 54 are configured to provide an opening such as 53 to permit the entry and exit of shackles 36 which are conveyed along conveyor mechanism 34 and a poultry leg disposed in each shackle in the single file orientation as seen in FIG. 1.

The lower portion of housing 22 forming a water collecting basin, indicated generally at 58, which is most conveniently mounted to the upper portion via threaded fasteners 60 depending from each vertical leg 42 which are adapted to be received in holes provided in an outwardly extending rim or lip portion 62 provided on the upper edge of basin 58 and fixed via a conventional nut, not shown, to rim 62.

Alternatively, the side and front wall portions 50 and 52 may be erected after positioning mounting frame 40 and attaching basin 58 wherein the wall portions are merely held in place between legs 42, the housing of conveyor mechanism 34, and the attached basin 58 without welding or threaded fasteners. Note that a rim or lip portion 55 is provided on wall portion 50 which is adapted to rest upon rim 62 of basin 58 such that the wall portions are adequately supported in the desired position.

Basin 58 includes a front and rear wall portion 64 and 66 which are provided with openings 68 aligned with the openings 53 formed between the front and rear wall portions 52 and 54 to accommodate the entry and exit of a poultry leg mounted on a shackle 36 as it travels through the housing 22.

Figure 15:
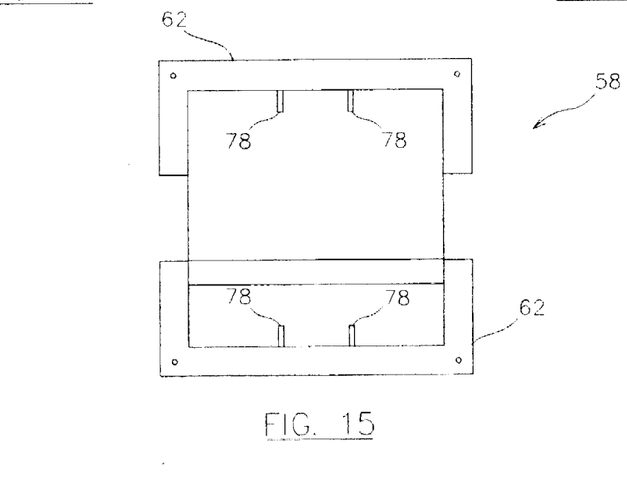
FIG. 15 is a top plan view of the lower chamber portion shown in FIG. 13.

Preferably these entry and exit openings are provided with flexible flaps, such as shown in FIG. 1 at 70 which deflect easily to permit a shackle carrying a poultry leg to enter and exit housing 22, yet close the opening after a shackle passes to minimize escape of any water spray created by the water knives into the surrounding environment. Flaps 70, may be made from any suitable flexible, water impervious material and may be attached along one side of each of the openings 68 via a metal strip 78 fixed to basin 58 via threaded fasteners or other conventional attaching means in the position as illustrated in FIGS. 15 and 16.

Basin 58 preferably also includes an inclined side wall 67 opposing side wall 71 which includes a door 72 pivoted about a hinge pin 73 which, upon opening upwardly about pivot pin 74 provides access to the inner portion of basin 58. This is advantageous when a grating 75 and drain pan 76 are mounted to the bottom of basin 58 via threaded fasteners and bolts in the manner shown in FIG. 16 to provide easy access to grating 75. Grating 75, supported on the upper edges of pan 76 will trap any poultry leg which inadvertently becomes dislodged from a shackle 36 such that it may be retrieved rather than falling as waste upon the floor.

Basin 58 preferably includes a pair of permanently mounted threaded shanks, such as at 78, on opposing portions of side walls 67 and 71 near, but spaced from the upper edge of each wall portion to accept one of an identical pair of water knife mounting bracket assemblies 80, as best seen in FIGS. 7–9 and 16.

Each bracket assembly 80 includes an L-shaped frame portion having a horizontal member 84 and a vertical member 82. The latter is provided with slots 85 adapted to receive threaded fasteners 78 via a nut 86 threaded onto each fastener 78 in a releasably fixed position within slots 85. This provides for vertical adjustment of bracket assembly 80 and the corresponding water knives as described below.

An upper plate 87 is suitably fastened to each member 84 via a pair of threaded fasteners 88 fixed to leg 84 which extend through slots 90 in plate 87 and receive suitable bolts, such as 92. This releasably fixed relationship permits horizontal adjustment of the water knives toward or away from the opposing wall of basin 58.

Top plate 87 further includes openings or slots 94 which are adapted to receive a threaded bolt 95 adapted to be received within a threaded hole provided in a respective one of spaced legs 96 which carries a tubular member 100 which forms a manifold communicating pressurized water to a plurality of aligned nozzles 102 provided in member 100. Member 100 may be fixed across legs 96 in a suitable manner, preferably by welding. A generally L-shaped spray shield 98 is fixed across the top of legs 96 to divert the water streams from the opposing nozzles 102 in the opposing manifold 100 downwardly during the time period when there is no product passing through the water streams as occurs because of the spacing of shackles 36 on conveyor 22.

As best seen in FIGS. 7–9 and 5 and 6, manifold 100 includes a plurality of drilled holes of a small size suitable to create a thin jet or stream of water. Alternatively, a suitable commercial nozzle may be mounted in each hole to direct the jet or stream of water outwardly from tubular member 100 toward the center of housing 22 and aligned generally at a right angle to the path of travel of the hock portion of a poultry leg carried by a shackle 36 to form an effective water knife. As is apparent from the drawings an identical water knife construction is provided in opposing aligned relationship on the opposing wall of housing 22 such that a poultry leg passes between the opposing water streams which are directed in opposite directions from one another. A plurality of water streams is preferred to assure that the passing hock portion is adequately exposed to the water cutting action such that a clean cut of the skin and the soft tissues comprising primarily the underlying tendons and/or ligaments is made completely about the whole circumference of the hock portion while maintaining adequate speed of travel of shackles 36 on conveyor 22 through the housing to enhance efficient production rates.

It should be noted that the opposing water jets from each of the nozzles are directed tangentially to both the forward and rearward portion of the hock area of the poultry leg as the leg moves past each individual water stream or jet at approximately a right angle to the direction of the water stream. This assures that a complete circumferential cut is achieved in a single pass through the cutting station. Further, the jets or streams forming the water knives can be controlled to avoid cutting or splintering the underlying bone which is a very undesirable occurrence in processing for commercial deboning applications.

A suitable water pump is employed to enable each stream of water from a nozzle 102 to be delivered at preferably about 4000 to 4500 psi which has been found adequate to work well for purposes of the present invention.

It should also be noted that when each set of nozzles 102 in the opposing water knives are disposed directly opposite one another as shown in the drawings, it is preferred that one set be slightly offset vertically relative to the other to avoid collision of the opposing streams when no product is present which tends to atomize the water spray. This result is not desirable for sanitary conditions.

Further, it is pointed out that the oppositely directed water knives may also be offset horizontally along the path of travel of the legs. For example one of the manifolds 100 may be disposed at the same vertical height downstream from the opposing set of nozzles. This arrangement also works equally well in providing a complete circumferential score cut around the whole hock area as the poultry leg passes both water knives as the whole periphery of the hock area is exposed to the oppositely directed water streams.

As best seen in FIGS. 5–9, one end of tubular member or manifold 100 is closed and the other end includes an inlet opening and a threaded portion and nut, such as 101, adapted to receive a conventional coupling connection with a supply hose which is conventionally connected to a source of pressurized water such as a suitable water pump, not shown. While appropriate small drilled holes will act as a suitable nozzles, it is preferred that commercially available nozzles be employed and inserted in small holes drilled into the wall of tubular member 100 which are spaced and aligned to deliver parallel, relatively closely spaced, water streams toward the center of housing 22. Hardened commercial nozzles better resist the wear caused by the high pressure water stream than a nozzle formed by merely drilling an appropriate sized hole in manifold 100 and can be merely replaced when worn or otherwise damaged.

The horizontal and vertical alignment of the streams of water forming the water knives for severing the hock area as described herein may be adjusted by manipulating the releasably fixed positions of the threaded fasteners 78 and 88 within slots 85 and 90 to dispose the streams in the appropriate position desired.

The enclosed housing 22 minimizes the likelihood of escape of any water spray from the water streams emitted through nozzles 102 as the water is directed downwardly from the upper housing portion to basin 58 and pan 76. A conventional drain opening is preferably provided in pan 76 and may be connected to a hose or the like to direct the waste water to a conventional sewer drain.

In accordance with the present invention a circumferential scoring cut is made to the hock area of a poultry leg traveling in a generally linear path in a single pass by the oppositely directed water jets disposed transverse to the direction of travel using a relatively simple mechanical assembly.

In view of the foregoing description, it should be readily understood by one of ordinary skill that an apparatus and method of automatically scoring poultry hocks is provided which is more efficient, reliable, and less expensive than the methods and means presently employed.

I claim:

1. An apparatus for scoring poultry hocks comprising, in combination,
   a) a housing generally forming an enclosure and provided with a pair of aligned openings forming an entry and exit, said housing mounted in aligned association to a conveyor for moving a plurality of vertically disposed poultry legs along a generally linear path of travel through said entry and exit openings in said housing;
   b) a pair of spaced apart cutting knives mounted in said housing and formed by a plurality of opposing pressurized water streams disposed at generally a right angle to the path of travel of said poultry legs, each of said streams being vertically aligned to contact a poultry leg carried by said conveyor at a predetermined height related to the hock area to sever and circumferentially separate surrounding soft tissues of the hock portion from the underlying bone as a leg passes through the opposing water streams.

2. The apparatus defined in claim 1 wherein each of said water knives comprises a manifold mounted in said housing and extending generally longitudinally along the path of travel of said poultry legs through said housing, each of said manifolds provided with a plurality of nozzles longitudinally spaced from one another in an substantially horizontal plane.

3. The apparatus defined in claim 2 wherein said manifolds are releasably fixed to said housing for adjustable movement in a horizontal and a vertical direction for adjustably aligning the said water streams.

4. An apparatus for scoring poultry hocks comprising, in combination,
   a housing including a cutting station disposed within a first compartment and a second compartment disposed below said first compartment communicating with a water collection and drain area;
   said first compartment including a pair of opposing side walls extending above said cutting station and a pair of opposing end walls including aligned openings for the ingress and egress of a poultry leg product;
   said cutting station including a pair of generally horizontally disposed mounting plates, a respective one of said plates being fixed to the inner surface of one of said side walls and extending outwardly from said inner surface and spaced from one another to define a path of travel through said compartment aligned with said ingress and egress opening in said end walls and
   a pair of cutting means, a respective one mounted to a respective one of said mounting plates in horizontally spaced relationship from one another, each of said cutting means comprising a tubular member extending parallel to said path of travel and including a plurality of longitudinally spaced nozzles directed inwardly toward said path of travel to direct a plurality of streams of water generally at right angles along a predetermined length of said path of travel; a source of pressurized water connected to each of said tubular members for delivering a pressurized stream of water from each of said nozzles; and a conveyor having a portion thereof disposed in said first compartment and aligned with said path of travel to carry and deliver a plurality of spaced poultry legs linearly along said path of travel to dispose a hock portion of said poultry legs to the opposing streams of water from said nozzles to circumferentially sever associated soft tissue surrounding said hock area.

5. A method of scoring the hock of a poultry leg to separate the outer skin and connective soft tissues in the hock area from the underlying bone, comprising the steps of;

a) directing oppositely disposed pressurized water streams generally at a right angle to a predetermined generally linear path;

b) directing a poultry leg disposed in a perpendicular position along said linear path to expose the hock portion of said leg to contact with said opposing water streams to circumferentially sever the skin and soft tissues surrounding said hock portion and detach said soft tissues completely from underlying bone in said hock portion.

* * * * *